(12) United States Patent
Poiret

(10) Patent No.: US 7,331,891 B2
(45) Date of Patent: Feb. 19, 2008

(54) TENSIONER FOR A CHAIN OR BELT

(75) Inventor: Christian Poiret, Coulogne (FR)

(73) Assignee: Renold PLC, Manchester (GB)

( * ) Notice: Subject to any disclaimer, the term of this patent is extended or adjusted under 35 U.S.C. 154(b) by 618 days.

(21) Appl. No.: 10/886,429

(22) Filed: Jul. 7, 2004

(65) Prior Publication Data

US 2005/0059517 A1 Mar. 17, 2005

(30) Foreign Application Priority Data

Jul. 16, 2003 (GB) .................. 0316575.0

(51) Int. Cl.
*F16H 7/08* (2006.01)
*F16H 7/22* (2006.01)

(52) U.S. Cl. ...................... 474/110; 474/109

(58) Field of Classification Search ........ 474/109–111, 474/136, 138, 140
See application file for complete search history.

(56) References Cited

U.S. PATENT DOCUMENTS

| 4,504,251 A | | 3/1985 | Mittermeier |
| 5,310,385 A | * | 5/1994 | Suzuki ........................ 474/110 |
| 5,370,584 A | | 12/1994 | Todd |
| 5,512,019 A | | 4/1996 | Shimaya et al. |
| 5,908,363 A | * | 6/1999 | Suzuki ........................ 474/101 |
| 6,053,831 A | * | 4/2000 | Boedo ......................... 474/109 |
| 6,126,563 A | * | 10/2000 | Simpson ..................... 474/110 |

2001/0003279 A1 6/2001 Rudolf et al.

FOREIGN PATENT DOCUMENTS

| DE | 3832512 C1 | * | 2/1990 | ................. 474/110 |
| DE | 4103055 | | 8/1992 | |
| DE | 10155364 A | * | 5/2003 | |
| EP | 0 348 861 A2 | | 1/1990 | |
| EP | 1 067 275 | | 1/2001 | |
| EP | 1 227 264 A1 | | 7/2002 | |
| JP | 10-38043 A | * | 2/1998 | |
| JP | 11-182639 | | 7/1999 | |
| JP | 11-201245 | | 7/1999 | |

* cited by examiner

*Primary Examiner*—Marcus Charles
(74) *Attorney, Agent, or Firm*—Michael Best & Friedrich LLP

(57) ABSTRACT

A chain or belt tensioner comprises a plunger displaceable in a bore of a housing between retracted and extended positions. The plunger and the bore between them define a variable volume chamber for receipt of pressurised hydraulic fluid. The tensioner is designed for insertion into a supporting bore of the cylinder head of an internal combustion engine such that the plunger has only a limited number of possible orientations so that it can engage with the tensioner arm. The plunger has an air purge passage that extends from adjacent to the chamber to atmosphere. The passage formation is designed so that there is a portion of it adjacent to the chamber is uppermost in any orientation of the plunger so as to ensure rapid and effective air purging. There may be a single air purge passage extending in an axial direction along the length of the plunger or a combination of several axial and circumferential portions that permit the plunger to be disposed in more than one orientation.

16 Claims, 5 Drawing Sheets

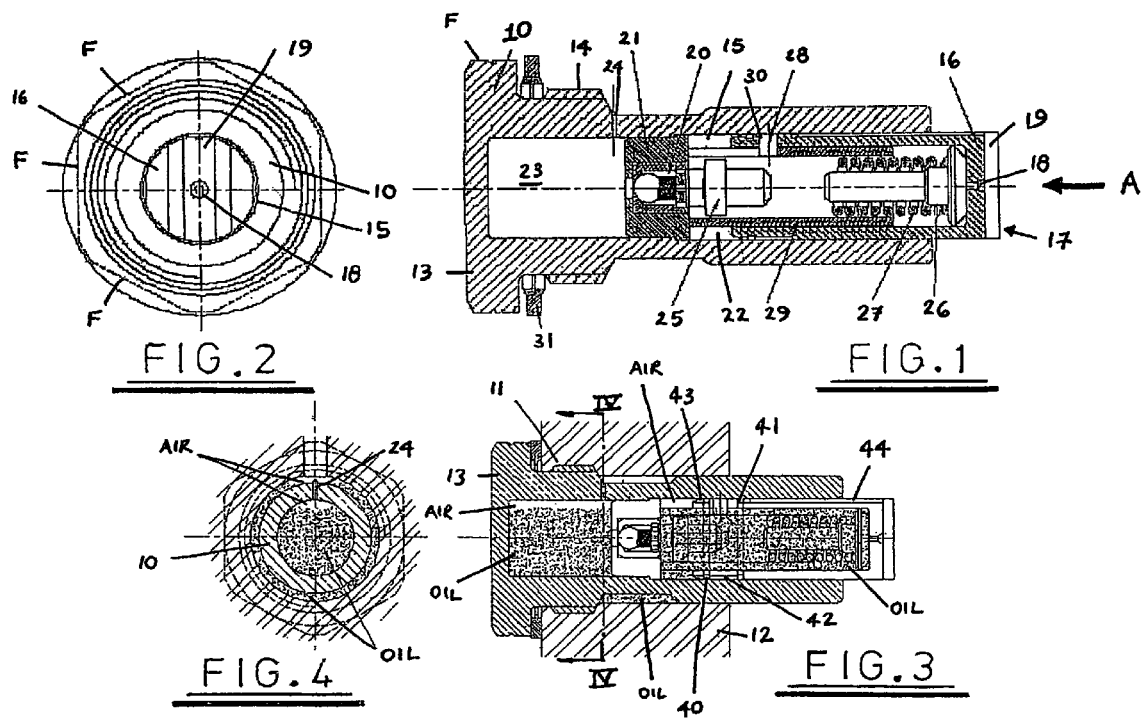

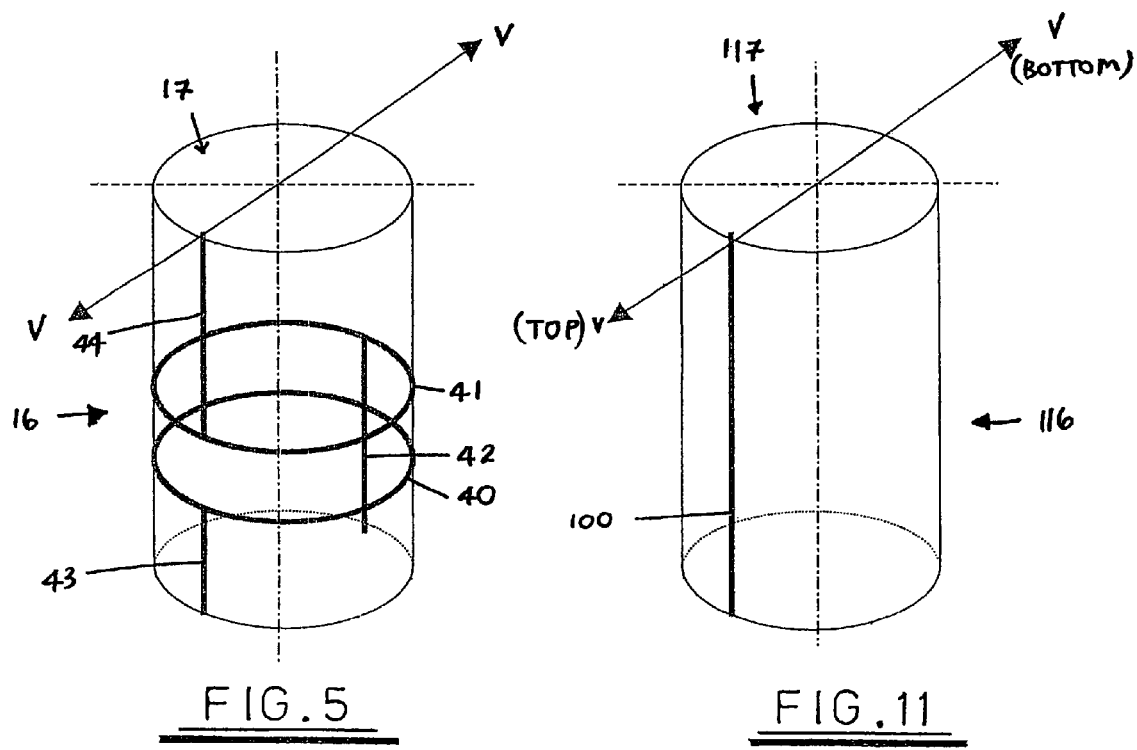

TENSIONER FOR A CHAIN OR BELT

CROSS-REFERENCE TO RELATED APPLICATIONS

Priority is hereby claimed to United Kingdom Patent Application No. 0316575.0, filed Jul. 16, 2003, the entire contents of which is incorporated herein by reference.

FIELD OF THE INVENTION

The present invention relates to a tensioner for a chain or belt and more particularly, but not exclusively, to a tensioner for imparting tension to a chain or belt of the kind that is used, for example, in a timing drive of an internal combustion engine of a vehicle.

SUMMARY

Internal combustion engines of motor vehicles often include a timing belt or chain drive that passes over sprockets on the crankshaft and camshaft and is used to ensure that the camshaft is driven synchronously with the crankshaft. The tension in such a chain or belt varies considerably as a result of the expansion and contraction of engine components with temperature, torsional vibrations imparted from the crankshaft and camshaft, the engine speed and chain elongation as a result of chain wear or temperature variations in chain components. It is important to impart to and maintain tension in the chain or belt so as to reduce noise and the likelihood of the chain or belt jumping from the teeth of the sprockets.

Tensioners for chains or belts generally comprise a housing that defines an open-ended cylinder in which a plunger is slidably movable in a longitudinal direction and is biased outwardly of the cylinder by a coil spring so as to impart tension to the chain or belt. A variable volume fluid pressure chamber is defined between a hollow in the plunger and the cylinder walls. A check valve permits hydraulic fluid, such as oil, to pass from a source such as an oil pump into the pressure chamber but prevents passage of fluid in the reverse direction. The fluid in the pressurised chamber also serves to bias the plunger out of the cylinder towards the chain or belt.

The combined effect of the hydraulic fluid pressure and the coil spring biasing forces moves the plunger out of the housing and into contact with the chain or belt so as to take up the slack. An opposite resisting force is imparted from the chain to the plunger as a result of the tension induced in the chain by the drive. If the chain or belt is subjected to an increase in tension the resulting force applied to the plunger attempts to move it into the cylinder. However, such movement is prevented by the check valve, which prevents the escape of hydraulic fluid out of the chamber. The incompressible nature of the hydraulic fluid prevents instant return movement of the plunger although a small annular clearance between the plunger and the cylinder wall may permit some fluid escape and limited slow retraction of the plunger.

One problem with existing tensioners is to ensure efficient purging of air that becomes trapped in the oil chamber during operation. Entrapped air affects the performance of the tensioner as it is significantly more compressible than the hydraulic fluid and therefore allows the plunger to be forced back into the housing more than desired by the resisting force applied by the chain. This can result in chain slippage, whine or rattle.

It is an object of the present invention to provide for a chain or belt tensioner that obviates or mitigates the aforementioned drawback According to a first aspect of the present invention there is provided a chain or belt tensioner comprising a housing and a plunger displaceable in a bore of the housing between retracted and extended positions, the plunger having a first end disposed in said housing and a second end for projection from said housing, a variable volume chamber defined by the plunger and the bore for receipt of hydraulic fluid, a source of hydraulic fluid, a check valve disposed to allow transfer of the hydraulic fluid from the source to the chamber when the fluid reaches a predetermined pressure and to prevent flow of hydraulic fluid in the reverse direction, biasing means for biasing the plunger towards the extended position, characterised in that an outside surface of the plunger forms a fluid tight seal with an inside surface of the housing bore and in that there is provided a passage defined on the outside surface of plunger or the inside surface of the housing, the passage extending along a length of the bore between the plunger and the housing and having an inlet end adjacent to and in communication with said chamber and an outlet end in communication with atmosphere.

The arrangement of the present invention ensures that air present in the chamber of the tensioner is purged rapidly and efficiently through the passage. By providing a passage that starts at the chamber and extends at least in part along the bore between the plunger and housing it ensures that all or the majority of the air is purged through the passage as it tends to collect at the top of the chamber.

Preferably the plunger and bore are substantially cylindrical.

The second end of the plunger is for engaging with a tensioner arm and preferably has a formation for co-operation with a corresponding formation on the arm such that the plunger can be oriented in one or more positions, the formation being disposed such that the inlet end of the passage is disposed at the top of the chamber so as to receive air for purging from the chamber. The plunger may be unidirectional in angular orientation in the bore or may be used in one of many possible angular orientations.

The passage may have a plurality of inlet ends so that the plunger can be selectively oriented in one of a plurality of positions in each of which one of said plurality of inlet ends is at the top of the chamber. This ensures that in whichever orientation the plunger is used the air purge passage is located at the top of the chamber to effect rapid and effective purging.

The passage may have at least a portion that extends in a direction parallel to the longitudinal axis of the plunger. The passage may extend axially along a fixed radial position between the first and second ends of the plunger. In such an embodiment the plunger is intended for use in only one angular orientation.

In a preferred embodiment where the plunger may be oriented in one of a number of positions the passage has a plurality of axially extending portions and a circumferentially extending portion.

The passage may have a first inlet end that extends axially along a first radial position and a second inlet end that extends axially along a second radial position, an intermediate portion that extends substantially circumferentially and joins the first and second portions and is connected to said outlet end. The first and second inlet ends may be disposed at diametrically opposed locations.

The outlet end may extend in an axial direction.

In one preferred embodiment the passage has two substantially circumferential portions intermediate said inlet and outlet ends and which are spaced apart and joined by an axially extending portion of the passage.

The passage may comprise a first and second inlet ends both extending axially, a third portion that extends around the circumference of the plunger or bore and fourth portion that is spaced from said third portion and extends around said circumference, the third and fourth portions being joined by either said first or second inlet ends and a fifth portion extending axially from said fourth portion to the second end of the plunger.

There may be provided a ratchet mechanism between the plunger and the housing so as to prevent retraction of the plunger beyond a predetermined distance.

The tensioner may further comprise a fluid reservoir adjacent to the chamber, the check valve being disposed between the reservoir and the chamber.

A throttle inlet to said reservoir may be provided.

According to a second aspect of the present invention there is provided the combination of a chain or belt tensioner as defined above and a support member in which the tensioner is received. The support member may be part of a housing for an internal combustion engine.

BRIEF DESCRIPTION OF THE DRAWINGS

Specific embodiments of the present invention will now be described, by way of example only, with reference to the accompanying drawings in which:

FIG. 1 is a longitudinal part-sectioned view of a chain tensioner according to the present invention;

FIG. 2 is an end view of the tensioner looking in the direction of arrow A of FIG. 1;

FIG. 3 is a longitudinal part-sectioned view of the chain tensioner of FIG. 1 shown filled with oil and installed position in the cylinder block of the internal combustion engine;

FIG. 4 is a sectioned end view along line B-B of FIG. 3;

FIG. 5 is a schematic representation of a plunger of the tensioner of FIG. 1;

FIG. 11 is a schematic representation of an alternative embodiment of a plunger for the tensioner of the present invention;

DETAILED DESCRIPTION

Figure 9A:
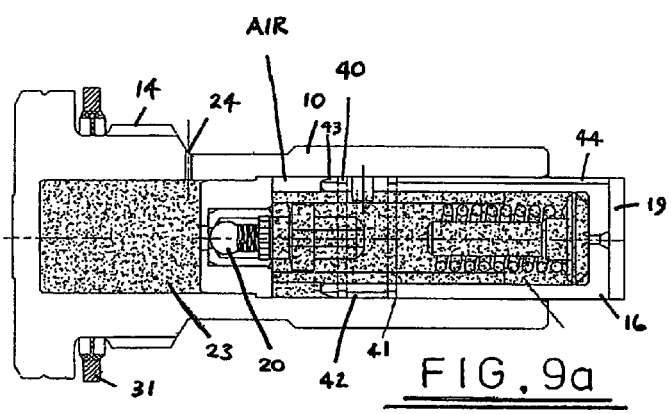
FIG. 9a is a view corresponding to FIG. 1 showing the tensioner filled with oil and in a first rotational orientation.
Figure 6:
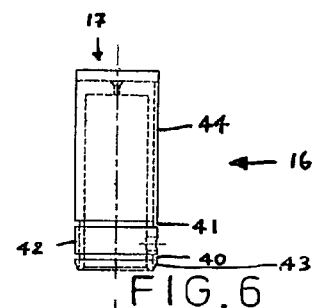
FIGS. 6 to 8 are respectively side, end and part sectioned side views of the plunger of the tensioner of FIG. 1.
Figure 7:
Figure 9B:
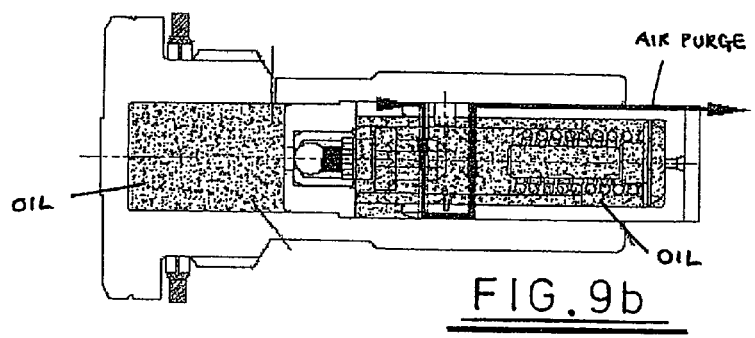
FIG. 9b is a view corresponding to FIG. 9a shown with an indication of the air purge flow.
Figure 8:
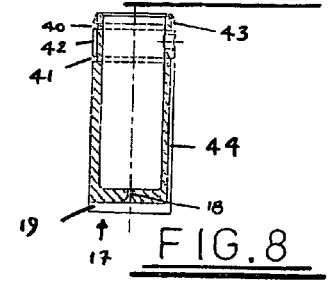
Figure 10A:
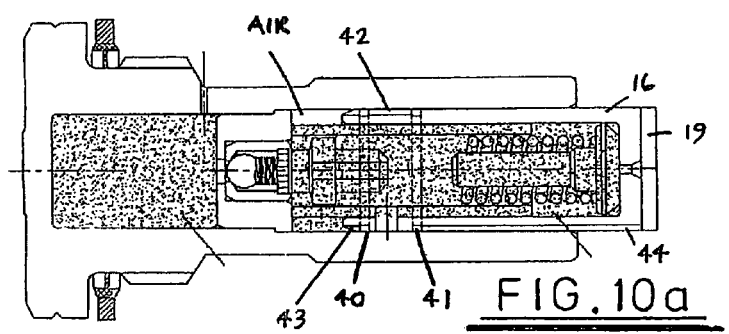
FIG. 10a is a view of the tensioner of FIG. 9a shown in a second rotational orientation.
Figure 10B:
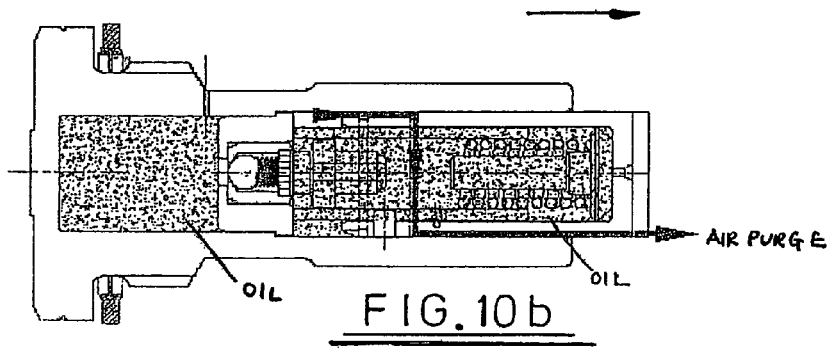
FIG. 10b is a view corresponding to FIG. 10a shown with an indication of the air purge flow.

Referring now to the FIGS. 1 to 10 of the drawings, the exemplary chain tensioner has a housing body 10 that is designed to be inserted into a threaded bore 11 defined in an internal combustion engine cylinder block 12 (shown in FIG. 3). The body 10 has, at one end, a head 13 with a plurality of flats F for engagement with an appropriate fastening tool (not shown) and an adjacent threaded portion 14 by which the tensioner is screw-engaged in the bore 11.

The tensioner body 10 is generally cylindrical and has a blind bore 15 that is open at one end to receive a slidable hollow plunger 16. The exposed end 17 of the plunger 16 is closed except for a small central outlet vent 18 and defines a channel 19 for abutment with a complementary formation on the underside of a movable blade (not shown) that supports a chain guide or shoe (not shown).

The interior of the bore 15 is divided into two chambers by a check valve assembly comprising a ball check valve 20 and support 21. To the right of the check valve assembly the plunger 16 and bore 15 define a variable volume chamber 22 that is filled with hydraulic oil. To the left of the check valve assembly the bore 15 defines an oil reservoir 23 that supplies oil to the chamber 22 via the ball check valve 20. The oil reservoir 23 is in turn supplied with oil from the vehicle engine oil supply via a radial inlet passage 24 that is designed as a throttle to limit the pressure of the oil in the reservoir. The reservoir 23 ensures that there is sufficient oil available at engine start-up (when the engine oil pressure is low) for the tensioner to work effectively. When the pressure of the oil in the reservoir 23 exceeds that in the chamber 22 the ball valve 20 is opened to permit passage of oil into the chamber 22. Conversely, when the oil pressure in the chamber 22 exceeds that of the reservoir 23 the ball returns to its seat and the check valve 20 is closed so as to prevent escape of oil from the chamber 22. A nozzle 25 inside the chamber 22 assists the flow of the oil therein.

Access to the vent 18 from inside the chamber 22 is restricted by a venting plug 26 of known design so as to limit the escape of air and oil.

A compression spring 27 is disposed coaxially between the closed end 17 of the plunger 16 and the base of the housing bore 15 (for clarity only part of spring is shown in the figures) and serves to bias the plunger 16 outwards of the housing body 10 towards the chain so as to impart tension thereto.

Interposed between the plunger 16 and the compression spring 27 there is provided a ratchet locking mechanism 28 of known configuration that is designed to prevent excessive retraction of the plunger 16 even when the fluid pressure is low. The mechanism is embodied by a cylinder 29 with a helical toothed slot in which a peg 30 on the plunger 16 is engaged in step-wise fashion.

An annular seal 31 is provided adjacent to the head 13 so as to seal the tensioner in the threaded bore 11 in the engine cylinder block 12 in the manner shown in FIG. 3.

The plunger 16 and housing bore 15 are dimensioned so as to be a close fit such that relative reciprocal movement is permitted but oil in the chamber is prevented from leaking out between them. The outside surface of the plunger 16 has a pattern of V-section grooves defined thereon as can be seen in FIGS. 1 and 3 to 10. First and second grooves 40, 41 of the pattern are circumferential and located towards the open end of the plunger. They are spaced apart and joined by a third groove 42 that extends in the axial direction (i.e. parallel to the longitudinal axis of the plunger) to the open end of the plunger 16. Fourth and fifth grooves 43, 44 also extend in the axial direction but are disposed diametrically opposite to the third groove 42. The fourth groove 43 extends from the open end of the plunger to a position where it meets the first circumferential groove 40 and the fifth groove 44 extends from the second circumferential groove 41 to the closed end 17 of the plunger 16. The grooves are designed to allow air trapped in the oil chamber 22 to escape and are of a depth that permits air to flow easily but prevents any significant oil flow in view of its greater viscosity in comparison to air. Since air is less dense than the oil it tends to collect at the top of the chamber adjacent to the third groove 42.

The axial grooves 42, 43, 44 are arranged to have a predetermined orientation with respect to the channel 19 on the closed end of the plunger 16. This ensures that when the tensioner is fitted to the engine block 11 the grooves 40-44 are positioned to ensure effective and efficient air purging. When the tensioner is screw-inserted the plunger 16 is rotated in the bore 15 to bring the channel 19 into the correct orientation to receive the formation on the underside of the blade. In this position either the third or fourth groove 42, 43 (both of which extend from the open end of the plunger 16) is at the top of the oil chamber 22 and occupies a vertical plane (illustrated by line V-V in FIG. 5) that intersects the longitudinal axis of the tensioner. One such orientation is shown in FIG. 9a. Here air collects in the top left corner of the oil chamber immediately adjacent to the fourth groove 43 such that air can immediately be purged by passing along the fourth groove 43 and then in sequence via the first, third, second and fifth grooves 40, 42, 41 and 44 as illustrated by the arrow in FIG. 9b. In an alternative orientation shown in FIG. 10a the third groove 42 is disposed at the top so that the air that collects in the top left of the oil chamber 22 is purged through the third groove 42 and then in sequence via the second groove 41 to the fifth groove 44 as illustrated by the arrow in FIG. 10b. In both cases the arrangement provides for rapid and full purging of the trapped air.

In practice the tensioner bore may be inclined slightly to the horizontal so that the head end 13 of the tensioner is disposed slightly above the closed end 17 of the plunger 16. This encourages the air in the oil chamber 22 to collect at the top left so that the air purge action is expedited.

For effective operation, the ratio of the oil passage 24 are to the outlet area of the groove is designed to be around 3.3 or more.

The groove or grooves may be formed by laser machining, milling or broaching.

An alternative simplified embodiment of the plunger is illustrated schematically in FIG. 11 in which there is provided a single groove 100 along the outside of the plunger 116 extending in parallel with the longitudinal axis thereof. In this embodiment the tensioner plunger is unidirectional in that the groove 100 must be oriented upwards so as to ensure effective air purging.

Figure 12:
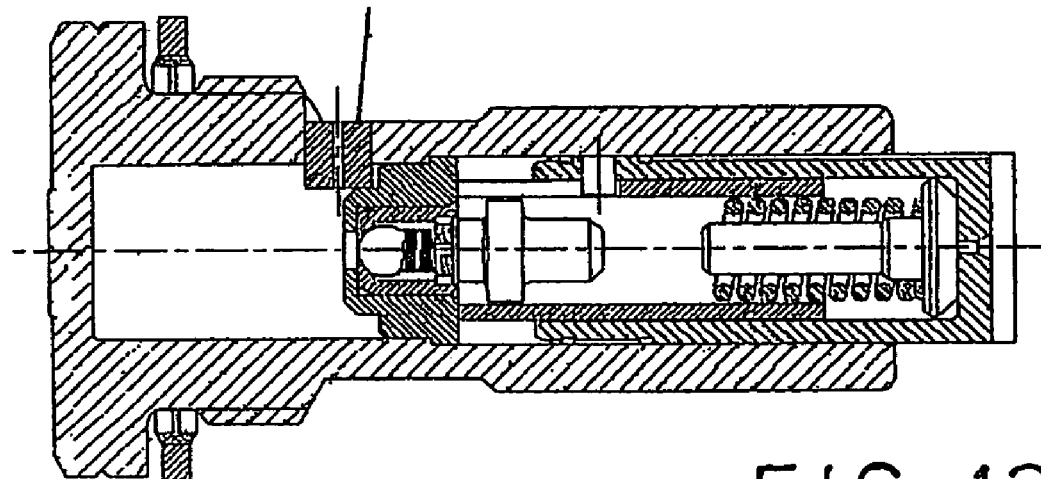
FIG. 12 is an alternative embodiment of the chain tensioner of the present invention shown with a press-fitted inlet nozzle.
Figure 13:
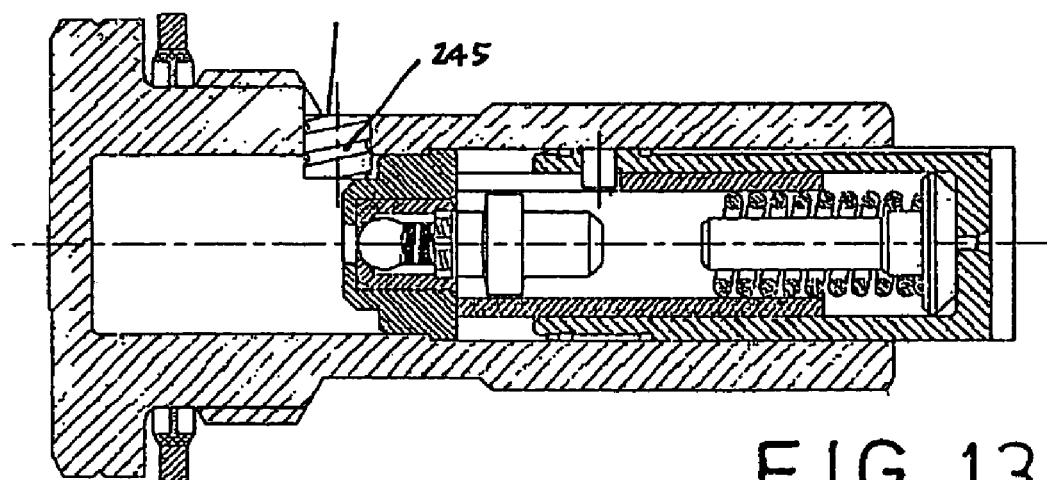
FIG. 13 is a further alternative embodiment of the chain tensioner of the present invention shown with an inlet plug with screw groove.

FIGS. 12 and 13 show alternative embodiments of the invention with different oil inlet designs. In the FIG. 12 version the oil inlet is a nozzle 124 that is press-fitted into a radial bore in the tensioner housing and in the embodiment of FIG. 13 the inlet is provided by a plug 224 with an external screw formation 245.

It will be appreciated that numerous modifications to the above described design may be made without departing from the scope of the invention as defined in the appended claims. For example, the air purge groove formations may be defined on the inside surface of the tensioner housing adjacent to the plunger as opposed to being on the plunger itself.

The invention claimed is:

1. A chain or belt tensioner comprising a housing and a plunger displaceable in a bore of the housing between retracted and extended positions, the plunger having a first end disposed in said housing and a second end for projection from said housing, a hollow area defined in said plunger, a variable volume chamber defined by the hollow in said plunger and the bore for receipt of hydraulic fluid, a source of hydraulic fluid, a check valve disposed to allow transfer of the hydraulic fluid from the source to the chamber when the fluid reaches a predetermined pressure and to prevent flow of hydraulic fluid in the reverse direction, biasing means for biasing the plunger towards the extended position, characterised in that an outside surface of the plunger forms a fluid tight seal with an inside surface of the housing bore and in that there is provided a passage defined on one of the outside surface of the plunger and the inside surface of the housing, the passage extending along a length of the bore between the plunger and the housing and having at least one inlet end adjacent to and in communication with said chamber and an outlet end in communication with atmosphere, the passage permitting the purging of air trapped in the chamber;

wherein the passage has two substantially circumferential portions intermediate said inlet and outlet ends and which are spaced apart and joined by an axially extending portion of the passage.

2. A chain or belt tensioner according to claim 1, wherein the plunger and bore are substantially cylindrical.

3. A chain or belt tensioner according to claim 1, wherein the second end of the plunger is for engaging with a tensioner arm and has a formation for co-operation with a corresponding formation on the arm such that the plunger can be oriented in one or more positions, the formation being disposed such that the inlet end of the passage is disposed at the top of the chamber so as to receive air for purging from the chamber.

4. A chain or belt tensioner according to claim 3, wherein the passage has a plurality of inlet ends so that the plunger can be selectively oriented in one of a plurality of positions in each of which one of said plurality of inlet ends is at the top of the chamber.

5. A chain or belt tensioner according to claim 4, wherein the passage has a plurality of axially extending portions.

6. A chain or belt tensioner according to claim 5, wherein the passage has a first inlet end that extends axially along a first radial position and a second inlet end that extends axially along a second radial position.

7. A chain or belt tensioner according to claim 6, wherein the first and second inlet ends are disposed at diametrically opposed locations.

8. A chain or belt tensioner according to claim 6, wherein the outlet end extends in an axial direction.

9. A chain or belt tensioner according to claim 4, wherein the passage comprises a first and second inlet ends both extending axially, a third portion that extends around the circumference of the plunger or bore and fourth portion that is spaced from said third portion and extends around said circumference, the third and fourth portions being joined by either said first or second inlet ends and a fifth portion extending axially from said fourth portion to the second end of the plunger.

10. A chain or belt tensioner according to claim 1, wherein the axially extending portion of the passage extends in a direction substantially parallel to the longitudinal axis of the plunger.

11. A chain or belt tensioner according to claim 1, wherein there is provided a ratchet mechanism between the plunger and the housing so as to prevent retraction of the plunger beyond a predetermined distance.

12. A chain or belt tensioner according to claim 1, wherein there is provided a fluid reservoir adjacent to the chamber, the check valve being disposed between the reservoir and the chamber.

13. A chain or belt tensioner according to claim 12, wherein there is provided a throttle inlet to said reservoir.

14. A chain or belt tensioner according to claim 1, wherein the passage is formed by laser machining.

15. The combination of a chain or belt tensioner according to claim 1 and a support member in which the tensioner is received.

16. The combination of claim 15, wherein the support member is part of a housing for an internal combustion engine.

* * * * *